(12) United States Patent
Nilsson (10) Patent No.: US 11,067,435 B2
(45) Date of Patent: Jul. 20, 2021

(54) METHOD FOR DETERMINING A SPATIAL LIGHT DISTRIBUTION IN AN ENVIRONMENT

(71) Applicant: Dan-Eric Nilsson, Lund (SE)

(72) Inventor: Dan-Eric Nilsson, Lund (SE)

( * ) Notice: Subject to any disclaimer, the term of this patent is extended or adjusted under 35 U.S.C. 154(b) by 161 days.

(21) Appl. No.: 16/462,997

(22) PCT Filed: Dec. 14, 2016

(86) PCT No.: PCT/EP2016/080901
§ 371 (c)(1),
(2) Date: May 22, 2019

(87) PCT Pub. No.: WO2018/108259
PCT Pub. Date: Jun. 21, 2018

(65) Prior Publication Data
US 2019/0293487 A1    Sep. 26, 2019

(51) Int. Cl.
*G01J 1/42*    (2006.01)
*G01J 1/04*    (2006.01)
(Continued)

(52) U.S. Cl.
CPC .......... *G01J 1/4204* (2013.01); *G01J 1/0488* (2013.01); *G01J 1/08* (2013.01); *G01J 1/4228* (2013.01);
(Continued)

(58) Field of Classification Search
CPC ...... G01J 1/4204; G01J 1/0488; G01J 1/4228; G01J 3/2803; G01J 3/28; G01J 1/08; G01J 2003/2806
See application file for complete search history.

(56) References Cited

U.S. PATENT DOCUMENTS 7,268,925 B1 *    9/2007    Green ................ H04N 9/04557
                                                                358/486
8,149,268 B1    4/2012    Meyers et al.
(Continued)

FOREIGN PATENT DOCUMENTS

| JP | 2003302669 A | 10/2003 |
| JP | 2005348328 A | 12/2005 |
| JP | 2006166132 A | 6/2006 |

OTHER PUBLICATIONS

Jose R.A. Torreao; "Natural Photometric Stereo", ANAIS DO IX SIBGRAPI, 29.10.-1.11.1996, CAXAMBU-MG, Brasil, Oct. 29, 1996, pp. 95-102.
(Continued)

*Primary Examiner* — Thanh Luu
*Assistant Examiner* — Monica T Taba
(74) *Attorney, Agent, or Firm* — Renner, Otto, Boisselle & Sklar LLP (57) ABSTRACT

The present invention relates to a method determining a spatial light distribution in an environment. The method comprising: acquiring (602) a spatially resolved light data set (100) by collecting light from the environment (202) using a camera, wherein the light data set (100) comprises a plurality of data elements of a first type (106), each data element of the first type (106) being associated with a vertical angle span and a horizontal angle span, wherein the vertical angle span and the horizontal angle span pertain to angles from which light from the environment (202) is incident on the camera, and each data element of the first type (106) comprising data pertaining to an amount of incident light within a first spectral range; and determining (604), based on the light data set (100), a vertical spatial distribution (122) of the light within the first spectral range.
(Continued)

The measurement is taken with a RGB camera and the pixel intensities of row are summed up and averaged.

14 Claims, 4 Drawing Sheets

(51) Int. Cl.
 *G01J 3/28* (2006.01)
 *G01J 1/08* (2006.01)
(52) U.S. Cl.
 CPC ............... *G01J 3/28* (2013.01); *G01J 3/2803* (2013.01); *G01J 2003/2806* (2013.01)

(56) References Cited

U.S. PATENT DOCUMENTS

2004/0047518 A1* 3/2004 Tiana ..................... G06T 5/50
 382/284
2015/0363931 A1* 12/2015 Olczak .................. G01J 1/4214
 348/175
2016/0110582 A1* 4/2016 Mercier ............... G06K 9/0063
 382/191

OTHER PUBLICATIONS

PCT/EP2016/080901; PCT International Search Report and Written Opinion of the International Searching Authority dated Sep. 8, 2017.

* cited by examiner

METHOD FOR DETERMINING A SPATIAL LIGHT DISTRIBUTION IN AN ENVIRONMENT

RELATED APPLICATIONS

This application is a national phase entry of International Application No. PCT/EP2016/080901 filed on 14 Dec. 2016 and published in the English language, which is hereby incorporated by reference.

TECHNICAL FIELD

The present invention relates to a method for determining a spatial light distribution in an environment.

BACKGROUND

Light conditions are important for the activities of humans and animals and for their perception of an environment. The light in an environment may thus include both artificial light sources such as lamps and light fixtures and natural illumination by the sun, moon or stars. Artificial light sources allow for mimicking of natural outdoor conditions in indoor environments, and also offer new possibilities to create unique lighting settings. The light condition may be natural or be a result of a deliberate use of light sources to achieve a desired effect in the environment. The light provided in an environment should, however, be suitable for the desired activities within that environment. For example, the light conditions may make an environment promote relaxation or productivity depending on the light setting in that environment. The safety of humans and animals may further be considered when designing efficient light conditions. It is further of importance to be able to correctly assess the light condition in an environment, especially if it is desirable to be able to mimic a given light condition.

A current standard method for measuring the light conditions in an environment is to measure the incident light, or illuminance, as a Lux value. However, such measurements suffer from limitations because they do not take account of the reflected light reaching the eyes of humans or animals in the environment. More relevant luminance measurements are hard to use because they vary over two orders of magnitude in different directions in any given scene. There is thus a need for improved methods for characterizing the light conditions of an environment.

SUMMARY OF THE INVENTION

In view of the above, it is an object of the present invention to provide an improved method for determining the light conditions of an environment and in particular for determining the light distribution in an environment. According to a first aspect a method for characterizing the light conditions of an environment is provided. The method comprising: acquiring a spatially resolved light data set by collecting light from the environment using a camera, wherein the light data set comprises a plurality of data elements of a first type, each data element of the first type being associated with a vertical angle span and a horizontal angle span, wherein the vertical angle span and the horizontal angle span pertain to angles from which light from the environment is incident on the camera, and each data element of the first type comprising data pertaining to an amount of incident light within a first spectral range; and determining, based on the light data set, a vertical spatial distribution of the light within the first spectral range.

The wording light condition may be construed as the light present in an environment.

The wording light distribution may further be construed as how the light present in an environment is spatially spread out or dispersed. The light in the environment may be directly emitted by or reflected, transmitted, or scattered by an object or objects within the environment.

The wording vertical angle span may be construed as a plurality of angles spanned in space in a vertical direction. The vertical angle span may be referred to as an elevation angle span.

The wording horizontal angle span may be construed as a plurality of angles spanned in space in a horizontal direction. In the presence of a reference plane the horizontal angle span may be referred to as an azimuth angle span.

The wording camera should be understood in a broad sense. A camera may be construed as a device arranged to spatially resolve light collected from an environment, the light pertaining to different spatial regions, or directions in the environment. The camera may thereby act as a detector of light with a spatial resolution. As an example, the camera may comprise a number of waveguides or optical fibers, each being configured to detect light from a certain direction in space. As a further example the camera may comprise an optical lens configured to spatially resolve light collected from the environment. Hence, the camera may act as a device configured to image the environment.

The camera may be configured to form an image of an object. The object may be the environment or a view of an environment. The camera may comprise a photosensitive surface that records the collected light. The camera may be a digital camera which records the collected light in digital form. The camera may be a portable device.

The method allows for an efficient characterization of features of the light conditions of the environment. Hence, an environment-characteristic light-profile may be provided, as will be described, which presents how much light reaches the camera from different elevation angles and within one or several spectral ranges. The method thus produces spatially resolved information on the light distribution in an environment, and may also produce spectral resolution. The method allows for classification of different light conditions of an environment or comparison between different environments. To this end an environment-characteristic light-profile may be determined, as will be described, which presents the amount of light reaching the camera from different elevation angles. The method produces spatially resolved information on the light conditions of an environment. The method further allows for classification of different light conditions of an environment or comparison between different environments. Hence, light conditions of environments that are considered, for example, good, pleasant or productive may be identified and are thus more easily set up or mimicked in other environments. In other words, the method allows for improved quantification of the light conditions of different environments. The environment may be determined by humans to have a light condition that is suitable for performing a specific task in the environment such as reading, learning, manufacturing or relaxing. The light conditions of an environment may also have an impact on animals present in the environment. Alternatively, the environment may be experienced by a human or an animal as an environment having unsatisfactory light conditions. The method allows for characterization and categorization of environments allowing for improved understanding of the light conditions of an environment and its implications of humans or animals. Based on the knowledge gained by the method, improved light conditions in indoor or outdoor environments may further be achieved.

By collecting light from the environment, the method allows for acquisition of a large number, typically many millions, of simultaneous luminance or radiance measurements within an environment. The method further provides a more reliable collection of spatially resolved light data than compared, for example, to a spot meter based measurements of prior art.

The method further allows for efficient computation of light statistics in an environment.

The light data set may comprise a plurality of data elements of a second type, each data element of the second type comprises data pertaining to an amount of incident light within a second spectral range, the second spectral range being different from the first spectral range, and wherein the method further comprises determining, based on the light data set, a vertical spatial distribution of the light within the second spectral range.

The method thereby allows the spatial distribution of light within different spectral ranges, i.e. light at different wavelengths to be determined. Information on the spectral range as well as the spatial distribution of that light over different directions may therefore be provided. The method, thus allows for characterization of light of different colors.

The act of acquiring may further comprise: determining said data pertaining to the amount of incident light within the first spectral range for each of the plurality of data elements of the first type by detecting an amount of light being incident on a respective sensor element of a first type of an image sensor of the camera, and/or determining said data pertaining to the amount of incident light within the second spectral range for each of the plurality of data elements of the second type by detecting an amount of light being incident on a respective sensor element of a second type of the image sensor of the camera.

The sensor elements of the first or the second type may thereby be different. The plurality of data elements of the first and the second type may therefore correspond to different sensor elements, or pixels of different types, of the images sensor. The sensor elements of the first or the second type may alternatively be of the same type. To this end, the sensor elements of the first or the second type may be differently optically filtered by optical filters such that light within different spectral ranges are sensed by the respective sensor elements. The plurality of sensor elements may thereby allow for multi-color imaging and analysis.

The light data set may further comprise a plurality of data elements of a third type, each data element of the third type comprises data pertaining to an amount of incident light within a third spectral range, the third spectral range being different from the first and the second spectral ranges. The method may further comprise determining, based on the light data set, a vertical spatial distribution of the light within the third spectral range. The method thereby allows for efficient color characterizing of the light conditions of an environment.

To allow simultaneous acquisition of a spatially resolved light data set pertaining to multi-spectral incident light, the sensor elements used for acquiring light within a first, second or third spectral range types, may be adjacent to each other forming a pixel on the image sensor.

The act of collecting light may comprise capturing a plurality of images of the environment. Different scenes within the environment may thereby be imaged. An advantage is that a better representation of the light conditions of an environment may be obtained.

A first image of the plurality of images may show a first view of the environment and a second image of the plurality of images shows a second view of the environment, wherein the first and second views are different.

The first and the second view may pertain to different scenes in the environment. The first and the second view may also be obtained by imaging the environment in different viewing directions, i.e. the camera may be rotated in-between the capturing the first and the second images of the environment in order to cover a larger angular field. The plurality of images allows for improved representation of the environment by, for example, stitching or averaging of the captured images.

Better light statistics may further be obtained as several images of a scene, each image having a different dynamic range may be obtained. Problems associated with signal saturation during imaging may thus be mitigated.

The light data set may comprise a reference data element of the first type being associated with a reference vertical angle span and a reference horizontal angle span pertaining to angles from which light from the environment is incident on the camera.

The light data set may comprise a reference data element of the first type being associated with a vertical angle span pertaining to a reference elevation in the environment.

The method may thereby provide an efficient referencing system. The referencing system allows for improved addition of or stitching of a plurality of images.

The reference plane may, for example, be a horizontal plane of the environment.

The light data set acquired by the camera may further be transformed into angular coordinates describing the incident angle spans of the data elements in the vertical and horizontal directions.

Thus, the reference data element of the first type may be associated with a reference horizontal angle span pertaining to angles from which light from the environment is incident on the camera. Such reference angles in the horizontal plane may defined to allow for stitching of images taken from the same camera position in space, but in different directions. Stitching may be used to extend the measurement field. In other words, multiple images from the same vantage point may be used to extend the total angular range by stitching images together.

Images from different vantage points within the same environment may also be used to better represent the whole environment.

Bracketing with different exposure values may further be used to improve the dynamic range such that reliable values are obtained for all directions, from the darkest to the brightest of a scene.

The method may further comprise calibrating a photon flux sensitivity or an absolute energy scale for the camera. Knowledge on the amount of photons emitted in the environment may thereby be determined. The photon flux calibration may comprise a photon flux per spectral range calibration allowing for determination of the amount of light within different spectral ranges.

The method may further comprise radiometrical calibration of the camera.

The act of calibrating may further comprise photometrical calibration of the camera.

The act of radiometrically calibrating the camera may be construed to comprise a measurement of light energy in terms of absolute power or photon flux within pre-defined spectral ranges. The act of photometrically calibrating the camera thereby differs from the act of radiometrically calibrating the camera by that the measurement of light takes into account the perceived brightness of a spectral range for the human eye. The radiant power or photon flux at each wavelength or a wavelength range may be weighted by a luminosity function that models the brightness sensitivity of the eye of the human.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

FIG. 3b illustrates a vertical spatial distribution of light obtained by the method for characterizing light conditions of an environment of FIG. 3a.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

In the following, a method for characterizing light conditions of an environment will be described in relation to FIGS. 1-6.

Figure 1A:
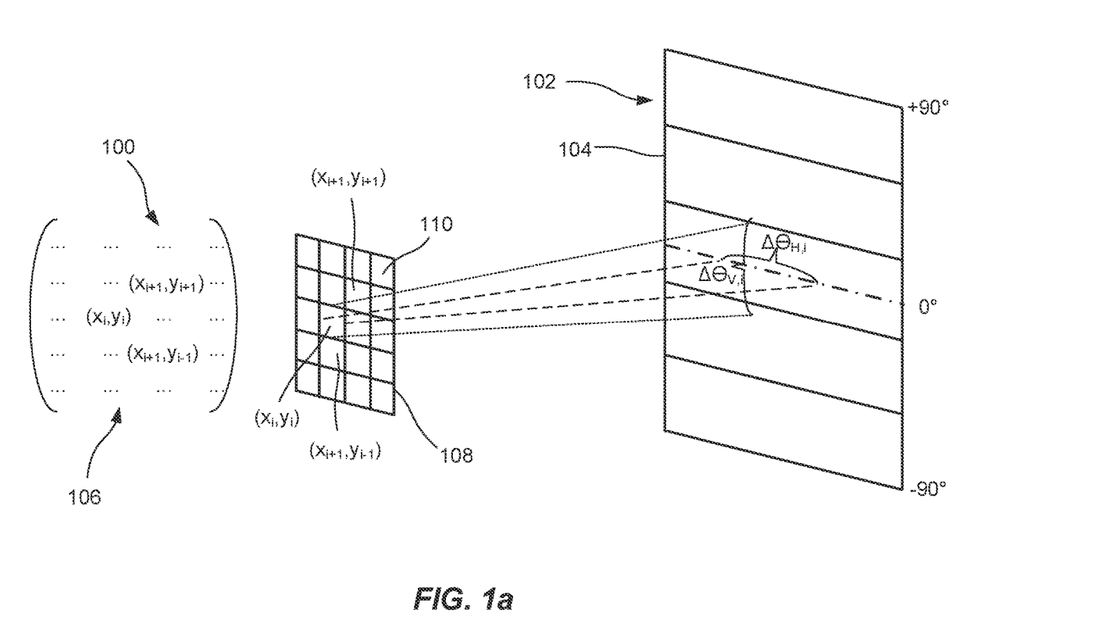
FIG. 1a illustrates a schematic view of the act of acquiring a spatially resolved light data set by collecting light from the environment using a camera.
Figure 6:
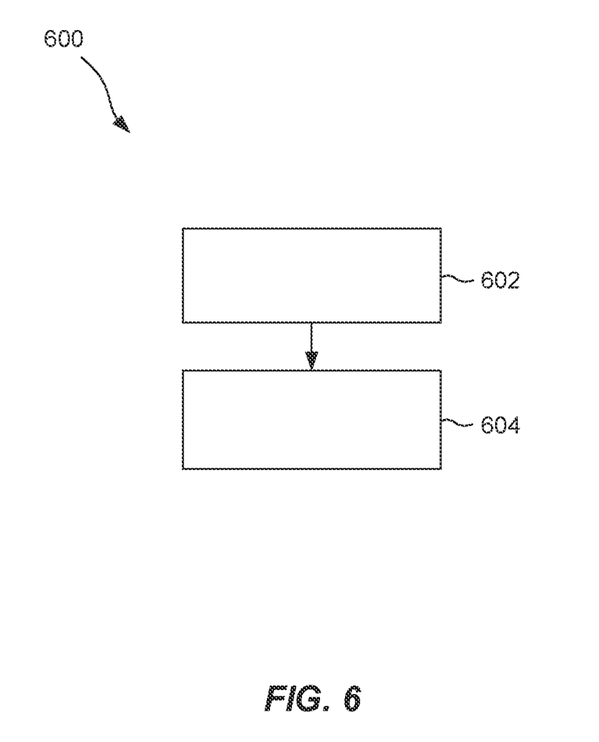
FIG. 6 illustrates a block diagram of a method for characterizing light conditions of an environment.

FIG. 1a illustrates a schematic view of the obtaining of a spatially resolved light data set 100 by the act of acquiring 602 a spatially resolved light data set by collecting light from the environment 102 using a camera, see also the block diagram 600 of the method in FIG. 6. For illustrative purposes only a sub-portion 104 of the environment 102 is illustrated. It should be noted that the sub-portion 104 of the environment 102 is, for simplicity, illustrated as a planar surface. The sub-portion 104 may alternatively be a portion of an area having a spherical surface e.g. a circular segment or an envelope surface. The sub-portion 104 of the environment 102 is exemplified to be imaged by the camera. It should be noted that a part of or the whole environment may be imaged by wide angle or integrating optics or by imaging a plurality of scenes of the environment. In FIG. 1a the total vertical span imaged by the camera spans across 180° as may be achieved by using, for example, a fish-eye objective. The amount of total vertical span may, however, differ depending on objective or image sensor used by the camera.

The light data set 100 comprises a plurality of data elements of a first type 106, each data element of the first type 106 being associated with a vertical angle span $\Delta\theta_V$ and a horizontal angle span $\Delta\theta_H$. The vertical angle span $\Delta\theta_V$ and the horizontal angle span $\Delta\theta_H$ pertain to angles from which light from the environment 102 is incident on the camera. The camera is illustrated by its image sensor 108 in FIG. 1a onto which the light from the environment is directed and detected. Each data element of the first type 106 comprises data pertaining to an amount of incident light within a first spectral range $\Delta\lambda_1$. More specifically, the data elements of the first type may be described as elements $[(x_i, y_i)_1; \#(\Delta\lambda_1)]$, i.e. comprising a spatial coordinate $(x_i, y_i)_1$ and a count $\#(\Delta\lambda_1)$.

Each spatial coordinate is associated with the vertical angle span $\Delta\theta_{V,i}$ and a horizontal angle span $\Delta\theta_{H,i}$ the count representing, for instance, the number of photons incident light or the number of electrons generated by the incident light, the incident light within the first spectral range $\Delta\lambda_1$.

The data elements of the first type 106 may be represented as elements in a matrix, as elements in an array or a vector. Hence, each data element of the first type 106 may correspond to an individual sensor element 110, e.g. a pixel, of the image sensor 108 or a plurality of sensor elements, not shown.

Figures 1B, 1C:
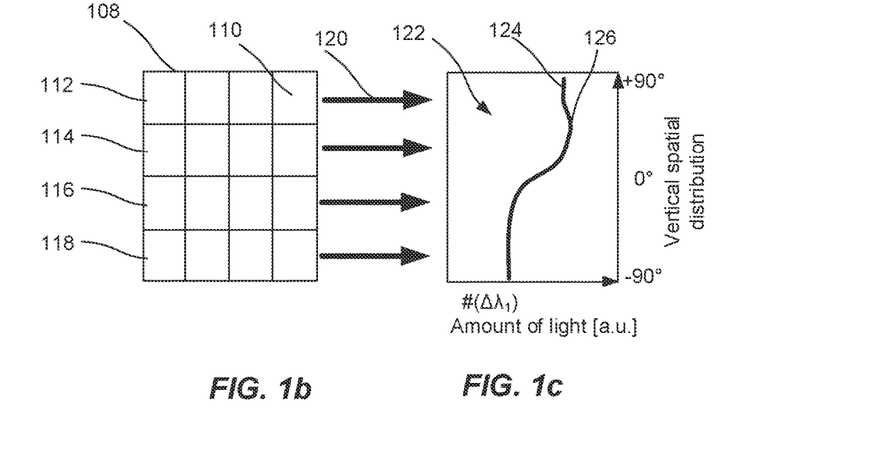
FIG. 1b illustrates an image sensor.
FIG. 1c illustrates a result of the method for characterizing light conditions of an environment.

FIG. 1b show the same images sensor 108 as in FIG. 1a from which a light data set 100 may be obtained by reading the sensor elements 110. As an example, each of the sensor elements 110 is associated with a vertical angle span $\Delta\theta_V$ and a horizontal angle span $\Delta t_H$, the vertical angle span $\Delta\theta_H$ and the horizontal angle span $\Delta\theta_H$ pertaining to different angles from which light from the environment 102 is incident on the camera. A vertical spatial distribution of light within the first spectral distribution may thereby be assessed by, for each vertical angle span $\Delta\theta_V$ and horizontal angle span $\Delta\theta_H$, determining the amount of light detected by individual sensor element 110, e.g. by calculating the amount of counts, count $\#(\Delta\lambda_1)$ for each spatial coordinate $(x_i, y_i)_1$ from the corresponding data elements of light data set 100. Thus, a vertical spatial distribution of the light within the first spectral range $\Delta\lambda_1$ may based on the obtained light data set 100 be determined 604, see act 604 of the method 600 in FIG. 6.

For a leveled camera, for instance leveled by use of a level or nivel, each sensor element of the first type 106 in a row of sensor elements, here illustrated by the rows 112, 114, 116, and 118, may be averaged 120 as the elements of a row correspond to the same vertical angle spans, but different horizontal angle spans.

The skilled person realizes that the acquisition of the light data set does not necessarily provide that the sensor element of the first type in a row of sensor elements pertain to the same vertical angle span. In other words, the sensor pixel lines do not follow the same vertical angle spans.

A transformation of the spatially resolved light data set acquired by the camera may therefore be performed such that sensor elements pertaining to the same vertical angle span are averaged.

Thus, sensor elements pertaining to a predefined vertical angle spans may be used to determine the light detected by for instance summing the respective sensor elements or by averaging.

Sensor elements may be averaged together by for instance different statistical measures such as mean, median, variance, standard deviation, or variation within other confidence intervals.

FIG. 1c illustrates a result 122 obtained by the method 600. From the graph 122 of FIG. 1c it may, for example, be deduced at which vertical angles light of the first spectral range $\Delta\lambda_1$ is strongest. In this example, the light of the first spectral range $\Delta\lambda_1$ is largest in the upper portion of the environment, i.e. in the range of 0° to 90°. A local maximum 126 at around +45° may further be identified providing information on at which vertical angle the light of the first spectral range $\Delta\lambda_1$ is dominating at the time of the imaging. As an example, the first spectral range $\Delta\lambda_1$ may correspond to the light emitted by the sun. The method thereby allows for determining the angle of the incident light at the time of the imaging. By imaging at different times during the day the changes to the light conditions may further be determined. As another example, if the environment is an indoor environment, such as an office space, the method thereby provides insights on how light within a spectral range is incident on vantage points in the office space. By choosing different spectral ranges when imaging, the detection of the distribution of light within different spectral ranges may be determined. In other words, a light data set may be obtained, in which the light data set comprises a plurality of data elements of a second type, each data element of the second type comprises data pertaining to an amount of incident light within a second spectral range, the second spectral range being different from the first spectral range, and wherein the method further comprises determining, based on the light data set, a vertical spatial distribution of the light within the second spectral range.

Natural light may, for example, be differentiated from man-made light sources. Different colors of light may further be detected. Based on the information provided by the method, the light conditions of different environments may be characterized and more easily mimicked.

The images sensor of the camera may alternatively comprise a plurality of sensor elements being elongated in one direction. By arranging the image sensor such that the elongated sensor elements correspond to a horizontal direction of the environment an averaging over the horizontal angular span detected by the camera may be obtained.

The light data set may be acquired by a camera with an image sensor with rows and columns of sensor elements. Alternatively, the light data set may be acquired by scanning a linear image sensor to sample a two-dimensional data set.

Figure 2A:
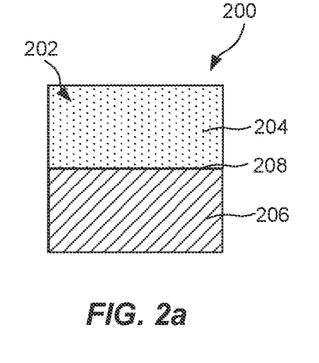
FIG. 2a illustrates an image of an outdoor environment.

FIG. 2a illustrates an image 200 of an outdoor environment 202, for example a grass field during daytime. The upper portion 204 of the image visualizes the sky and the lower portion 206 illustrates the grass field. The horizon 208 is set during the imaging to be in the centre of the image 200 when imaging the environment. The camera used for imaging the environment 200 comprises an image sensor 210, see FIG. 2b. The image sensor 210 may comprise a Bayer mask 212 covering the image sensor 210 of the camera. A square of four sensor elements or pixels 212 is thereby formed comprising one sensor element filtered red, e.g. the sensor element (xi, Yi)R, one filtered blue (Xi-1, Yi-1)s, and two filtered green (Xi-1, Yi)G and (xi, Yi-1)G in order to efficiently mimic that the human eye is more sensitive to green than to either red or blue. The image sensor 210 may therefore be described to comprise sensor elements of a first, a second, and a third type.

Figure 2B:
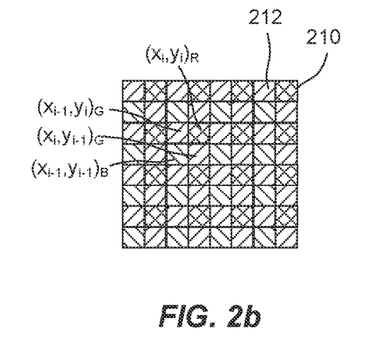
FIG. 2b illustrates an image sensor.

It may thereby be understood that the image sensor 210 is capable of detecting and separating light within different spectral ranges. As here exemplified the images sensor is sensitive to a first a second and a third spectral range which may, for example, correspond to a red, a blue, and a green part of the visible light spectrum. The blue part may, for example, comprise a wavelength range of 400-500 nm, the green part may comprise a wavelength range of 500-600 nm and the red part may comprise a wavelength range of 600-700 nm. A RGB type of characterization of the light conditions may thereby be obtained. It may further be noted that the first, the second, the third or an additional spectral range may alternatively correspond to ultraviolet light or infrared light or a sub-range thereof. A light data set, not shown, comprising information pertaining to the differently amount of light sensed by the differently filtered sensor elements 210 may thereby be acquired. In other words, a light data set comprising a plurality of data elements of a first type, a plurality of data elements of a second type and a plurality of data elements of a third type, each of the plurality of data elements corresponding the amount of light detected within a first, a second and a third spectral distributions.

The multicolor image sensor allows for the act of acquiring further comprises: determining said data pertaining to the amount of incident light within the first spectral range for each of the plurality of data elements of the first type by detecting an amount of light being incident on a respective sensor element of a first type of an image sensor of the camera, and/or determining said data pertaining to the amount of incident light within the second spectral range for each of the plurality of data elements of the second type by detecting an amount of light being incident on a respective sensor element of a second type of the image sensor of the camera. The act of acquiring may thus further comprise determining said data pertaining to the amount of incident light within the third spectral range for each of the plurality of data elements of the third type by detecting an amount of light being incident on a respective sensor element of a third type of the image sensor of the camera.

Figure 2C:
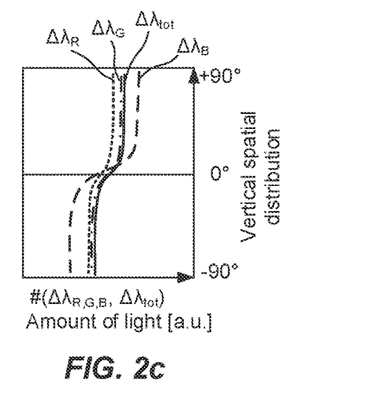
FIG. 2c illustrates a vertical spatial distribution of light.

As an example, FIG. 2c illustrates a vertical spatial distribution of light within the first, the second and the third spectral distributions, obtained, for the image 200, by determining the amount of light detected by the individual sensor elements of the image sensor 210. More specifically, by obtaining the amount of counts $\#(\Delta\lambda_R)$ $\#(\Delta\lambda_B)$ and $\#(\Delta\lambda_G)$ for the data elements of light data set corresponding to individual sensor elements of the different types, i.e. sensor elements having the spatial coordinates $(x_i, y_i)_R$, $(x_i, y_i)_B$ and $(x_i, y_i)_G$. From FIG. 2c it may be deduced that blue light, labeled $\Delta\lambda_B$ in FIG. 2c, is dominating in the upper portion 204 of the image 200, whereas the green light, labeled $\Delta\lambda_G$ in FIG. 2c, is strongest in the lower portion 206 of the image 200. The color distribution is, moreover, abruptly changed in the vicinity of the horizon 208 corresponding to a vertical angle span close to 0°. The contribution of red light, labeled $\Delta\lambda_R$ in FIG. 2c, is not very prominent in the environment 200. The amount of red light, $\Delta\lambda_R$, is less than the amount of green light, $\Delta\lambda_G$, for all vertical spatial angles in the image 200. The total amount of light $\Delta\lambda_{TOT}$ detected is further illustrated in the graph of FIG. 2c.

Figure 3A:
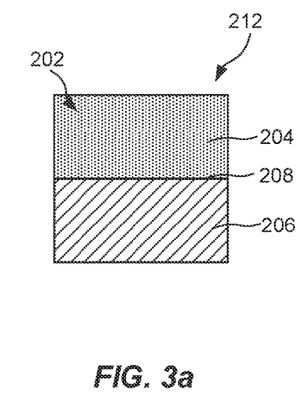
FIG. 3a illustrates an image of an outdoor environment.
Figure 3B:
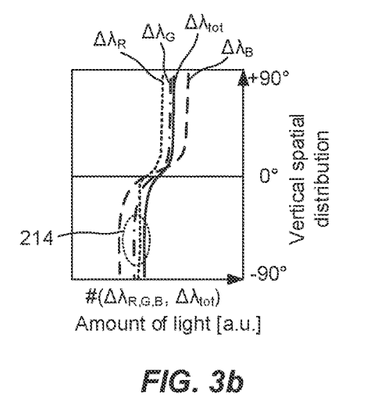

FIG. 3a illustrates an image 212 of the same environment, i.e. the grass field, but during afternoon. FIG. 3b a vertical spatial distribution of light within the first, the second and the third spectral distributions, obtained for the image 212 by determining the amount of light detected by the individual sensor elements of the image sensor 210 discussed above. From FIG. 3b it is illustrated that the amount of red light, labeled $\Delta\lambda_R$, becomes more pronounced later during the day corresponding to the change in the light profile of the sunlight reaching the environment. The red light is, for example, stronger than the green light in the lower portion 206 of the image 212, see the encircled area 214 in FIG. 3b.

The discussion above has outdoor environments as examples. The method for characterizing light conditions of an environment may, however be used also for indoor environments. Non-limiting examples of such indoor environments may be an office, a conference or lecture hall, a class room, a public space, an operating theatre, a nursing home, a barn or a stable. The light conditions for such environments may thereby be efficiently characterized. The method further allows for classification of different light conditions of the indoor environment or comparison between different indoor environments. Hence, the light conditions of environments which are considered, for example, good, pleasant or productive may be identified. Desired light conditions may, moreover be achieved in a certain environment by mimicking the light conditions of a specific environment that have been characterized by the method. The method thereby allows for improved possibilities to create good and efficient light conditions in other indoor environments.

Figure 4A:
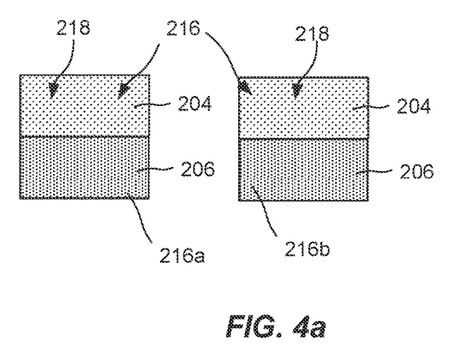
FIG. 4a illustrates two images of an indoor environment.

FIG. 4a illustrates two images 216a and 216b of a plurality of images of an indoor environment 218, e.g. an office environment. A first image 216a of the plurality of images 218 shows a first view which may be from a first vantage point within the environment and a second image 216b of the plurality of images shows a second view which may be from a second vantage point within the environment 218. The first and second views are different such that a larger portion of the environment is sampled. A better characterization of the environment is thereby provided. It should be noted that more than one image of the same scene may moreover be acquired to improve the dynamic range through different exposures. In other words, the act of acquiring 602 comprises capturing a plurality of images of the environment.

Figure 4B:
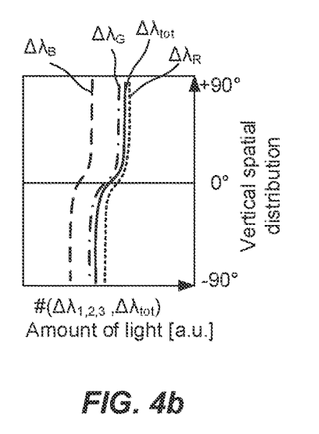
FIG. 4b illustrates a vertical spatial distribution of light obtained by the method for characterizing light conditions of an environment.

FIG. 4b illustrates a vertical spatial distribution of light within the first, the second and the third spectral distributions, obtained for the averaged images 216a and 216b, by determining the amount of light detected by the individual sensor elements of the image sensor 210 discussed above.

It should be noted that the word average should here be taken to include different statistical measures such as mean, median, variance, standard deviation or variation within other confidence intervals.

From FIG. 4b it may be deduced that blue light, labeled $\Delta\lambda_B$, is now reduced in intensity in the environment, whereas the amount of red light, labeled $\Delta\lambda_R$ is dominating throughout the image, i.e. the red light is larger than the amount of blue and green light, $\Delta\lambda_G$, for all vertical spatial angles of the environment. By comparing the results of FIG. 4b to the FIG. 2c or 3b it is observed that the light conditions are different. To this end, it may be noted that, if desired, the light conditions of the office environment may, however, be adjusted to resemble an outdoor environment by adjusting the light sources in the indoor environment such that a vertical spatial distribution of the light emitted by the light sources is achieved which resembles that of the outdoor environment. From the discussion above it is exemplified that the method allows for efficient characterization of the light conditions of an environment. The method further provides a simplified way to compare light conditions at different position within an environment or to compare the light conditions in different environments. The results of the vertical spatial distribution of light above illustrate that typical indoor vertical light-fields are different from all natural environments, raising the possibility that simulation of natural light-fields indoor will increase wellbeing and reduce stress. The same arguments can be extended to facilities for holding cattle, pigs, poultry etc., possibly improving production and reducing stress and poor health.

Figure 5:
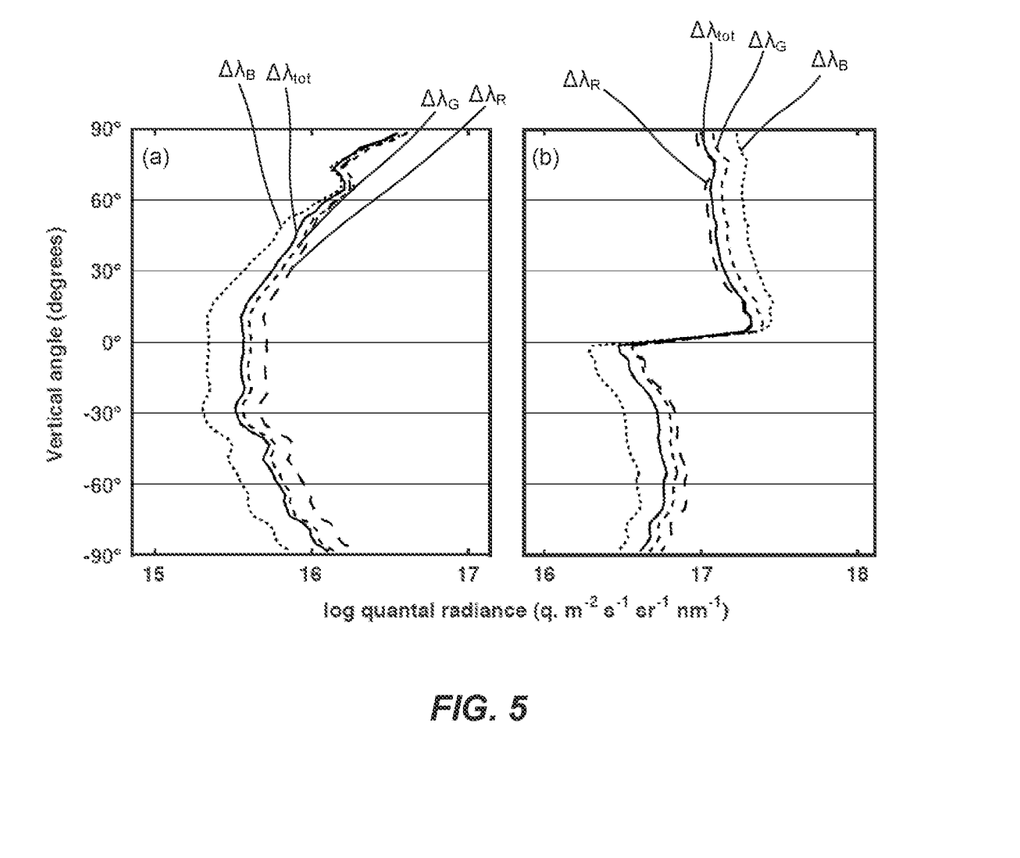
FIG. 5 illustrates an experimental realization of the method for characterizing light conditions of an environment.

FIG. 5 illustrates experimental results achieved by using the method described above. In more detail, a calibrated digital camera was used to record a plurality of wide field images of different scenes of an image. To provide the calibrated camera, the method 600 may further comprise calibrating a photon flux sensitivity or an absolute energy scale for the camera. The method may further comprise radiometrically calibrating the camera. The act of calibrating may further comprise photometrically calibrating the camera.

The images of the environment were obtained with a 180° fish-eye camera objective generating circular images, not shown, with the horizontal plane of the scenes arranged in the middle of the images. The centering of the horizontal plane in the image offers a simple reference system. More specifically, a light data set may be acquired which comprises at least a reference data element of the first type being associated with a reference vertical angle span and a reference horizontal angle span pertaining to angles from which light from the environment is incident on the camera.

It should be noted that the light data set may comprise a reference data element of the first type being associated with a vertical angle span pertaining to a reference elevation in the environment. The vertical angular distribution of light may thereby be characterized at locations differing in elevation in the environment.

A single image may represent the environment, or capturing several images and averaging them may allow for improved characterization of the environment. From the acquired calibrated images, average radiance at different vertical spatial distributions, i.e. vertical angles, may be determined. The calibration of the photon radiance per vertical angle span and wavelength spectral range providing a measurement unit of spectral photon radiance, could for example be in number of photons per spare meter, per second, per steradian, per nanometer wavelength, i.e. #photons $m^2\ s^{-1}\ sr^{-1}\ nm^{-1}$. To this end, the illuminance per spare meter, per second, per steradian, per nanometer may alternatively be derived. To this end, the wording radiance may also include luminance which is the equivalent measure based specifically on human spectral sensitivity.

An experimental realization of the method is illustrated in FIG. 5 from different environments. The graph of FIG. 5 illustrates the average radiance for the visible wavelength range, 400-700 nm. The curves labeled $\Delta\lambda_B$, $\Delta\lambda_G$, and $\Delta\lambda_R$, correspond to blue 400-500 nm, green 500-600 nm, and red 600-700 nm, parts of the light spectrum. The total amount of light $\Delta\lambda_{TOT}$ detected is further illustrated in the graph of FIG. 5. FIGS. 5a and 5b illustrate the light conditions in a dense sequoia forest and open woodland respectively.

The measurements were obtained with a Nikon SLR camera fitted with a 180° fish eye lens centered on the horizontal plane. This implies coverage of all vertical angles, from straight down to straight up, with a single exposure, but it should be noted that it is alternatively possible to move a camera fitted with a clinometer to cover large angular fields with more standard lenses.

The person skilled in the art realizes that the present invention by no means is limited to the preferred embodiments described above. On the contrary, many modifications and variations are possible within the scope of the appended claims.

For example, the color camera may use several optical filters covering the image sensor of the camera. The camera may, for example, comprise a red optical filter, a blue optical filter and a green optical filter.

Each of the plurality of data elements of the first type may correspond to at least two sensor elements of the first type. The usage of a plurality of sensor elements of a first type allows for "pixel" binning. The "pixel" binning allows signals from adjacent "pixels" to be combined and this can offer benefits in faster readout speeds and improved signal to noise ratios albeit at the expense of reduced spatial resolution.

The sensor elements of the second type or the third type may be binned.

The sensor elements may be sensitive to ultraviolet, visible, or infrared light.

Additionally, variations to the disclosed embodiments can be understood and effected by the skilled person in practicing the claimed invention, from a study of the drawings, the disclosure, and the appended claims.

The invention claimed is:

1. A method for determining a spatial light distribution in an environment, the method comprising:
    acquiring a spatially resolved light data set by collecting light from the environment using a camera, wherein the light data set comprises a plurality of data elements of a first type, each data element of the first type being associated with a vertical angle span and a horizontal angle span, wherein the vertical angle span and the horizontal angle span pertain to angles from which light from the environment is incident on the camera, and each data element of the first type comprising data pertaining to an amount of incident light within a first spectral range; and
    determining, based on the light data set, a vertical spatial distribution of the light intensity within the first spectral range; and
    averaging light intensity over a total horizontal angle span detected by the camera, and
    wherein the method comprises a referencing system having a reference plane corresponding to the horizontal plane of the environment, and
    wherein the method further comprises calibrating a photon flux sensitivity or an absolute energy scale for the camera, and
    wherein the total vertical angle span comprises −90 degrees to +90 degrees from the reference plane, and wherein the averaging of light intensity comprises determining the median light intensity, or determining the light intensity corresponding to confidence intervals around the median value.

2. The method according to claim 1, wherein the light data set comprises a plurality of data elements of a second type, each data element of the second type comprises data pertaining to an amount of incident light within a second spectral range, the second spectral range being different from the first spectral range; and wherein the method further comprises determining, based on the light data set, a vertical spatial distribution of the light within the second spectral range.

3. The method according to claim 1, wherein the act of acquiring further comprises:
    determining said data pertaining to the amount of incident light within the first spectral range for each of the plurality of data elements of the first type by detecting an amount of light being incident on a respective sensor element of a first type of an image sensor of the camera, and/or
    determining said data pertaining to the amount of incident light within the second spectral range for each of the plurality of data elements of the second type by detecting an amount of light being incident on a respective sensor element of a second type of the image sensor of the camera; and
    wherein the method includes the act of determining a spatial distribution of the light within the first spectral range and the act of determining a spatial distribution of the light within the second spectral range.

4. The method according to claim 1, wherein the act of collecting light comprises capturing a plurality of images of the environment, wherein the single images of the plurality of images have one or more of the following in common: taken from the same camera position, taken in the same direction, taken using the same elevation, using the same f-stop setting, and
    wherein the plurality of images is used to improve one or more of the following: extension of the measurement field, the total angular range, light statistics, dynamic range.

5. The method according to claim 4, wherein a first image of the plurality of images shows a first view of the environment from a first vantage point and a second image of the plurality of images shows a second view of the environment from a second vantage point, wherein the first and second views are different.

6. The method according to claim 1, wherein the light data set comprises a reference data element of the first type being associated with a reference vertical angle span and a reference horizontal angle span pertaining to angles from which light from the environment is incident on the camera.

7. The method according to claim 1, wherein the light data set comprises a reference data element of the first type being associated with a vertical angle span pertaining to a reference elevation in the environment, wherein the reference elevation may be zero compared to the horizon, and the reference data element is in the middle of the images.

8. The method according to claim 1, wherein the method further comprises radiometrical calibration of the camera.

9. The method according claim 1, wherein the act of calibrating further comprises photometrical calibration the camera.

10. The method according to claim 3 wherein the act of determining a spatial distribution includes the act of determining, based on one or more of the spatially resolved light data sets respectively and for each vertical angle span, the corresponding intensity value as an average of the intensities corresponding to horizontal angle spans having the same vertical angle span.

11. The method according to claim 10, wherein the determining of the average includes calculating the corresponding intensity value as they median of intensities corresponding to horizontal angle spans having the same vertical angle span corresponding to confidence intervals around the median value.

12. The method of claim 4 including one or more of the following: the step of stitching, the step of bracketing, using elongated sensor elements, using a Bayer mask.

13. Use of the method of claim 1 for preparing data for a graph for characterising a light condition of an indoor or outdoor environment, wherein the environment is selected from the group of: an office, a conference hall, a lecture hall, a class room, a public space, an operating theatre, a nursing home, a barn or a stable.

14. A camera arranged to spatially resolve light collected from an environment using the method of claim 1.

* * * * *